(No Model.)
G. W. STOCKMAN.
VAPOR OR GAS ABSORBER FOR AMMONIA REFRIGERATING APPARATUS.
No. 245,325. Patented Aug. 9, 1881.
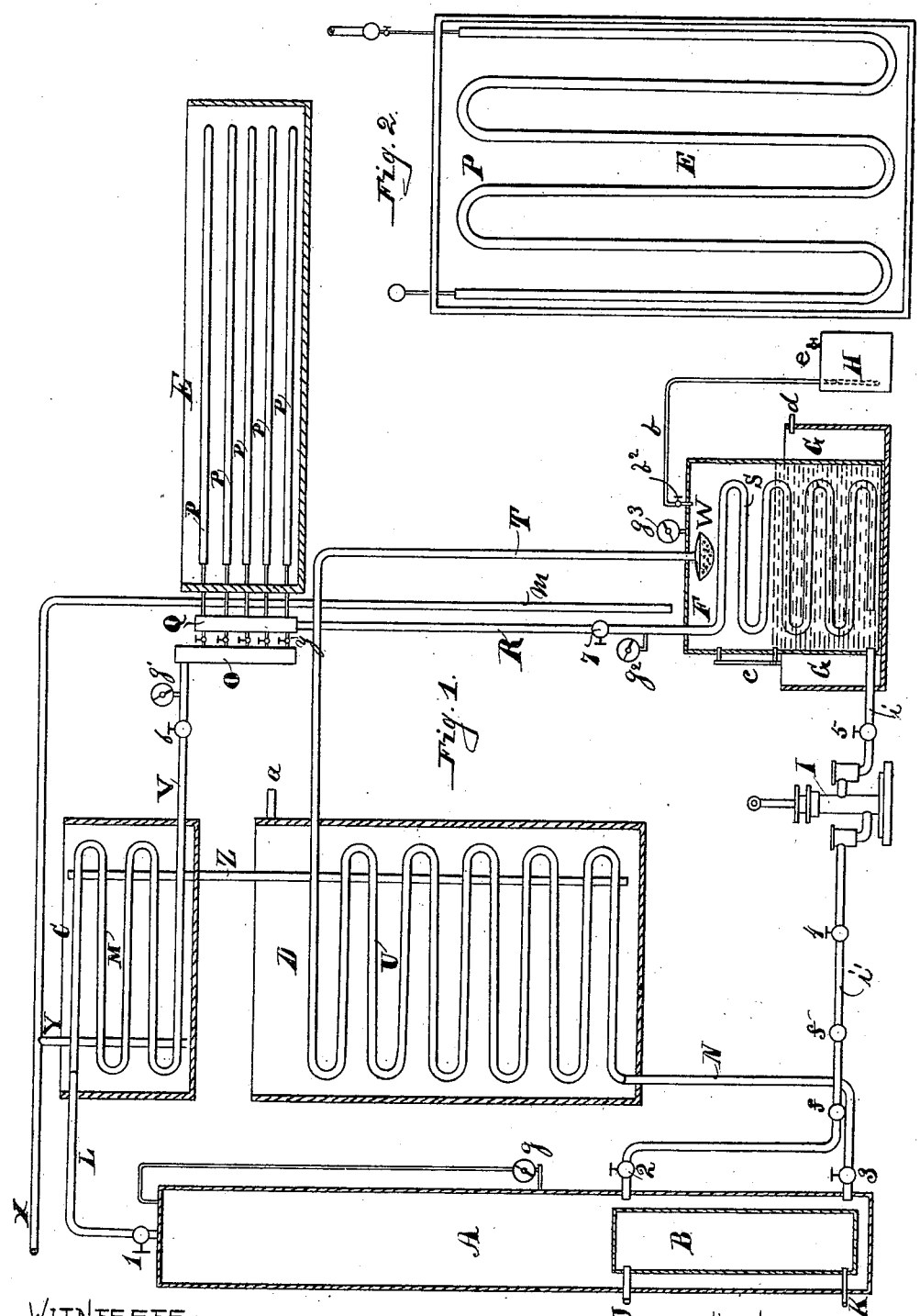
WITNESSES:
Samuel Stephens
G. H. Bennett
INVENTOR:
George W. Stockman,
Per E. C. Frink
his Attorney

UNITED STATES PATENT OFFICE.

GEORGE W. STOCKMAN, OF INDIANAPOLIS, INDIANA, ASSIGNOR OF ONE-HALF TO SAMUEL STEPHENS, OF SAME PLACE.

VAPOR OR GAS ABSORBER FOR AMMONIA REFRIGERATING APPARATUS.

SPECIFICATION forming part of Letters Patent No. 245,325, dated August 9, 1881.

Application filed February 7, 1881. (No model.)

To all whom it may concern:

Be it known that I, GEORGE W. STOCKMAN, a citizen of the United States, residing at Indianapolis, in the county of Marion and State of Indiana, have invented a new and useful Vapor or Gas Absorber for Ammonia Refrigerating or Ice-Making Apparatus, of which the following is a specification.

My invention relates to improvements in ammonia refrigerating or ice-making apparatus, in which my improved vapor or gas absorber operates in conjunction with an ordinary retort or evaporator, a vapor-condenser, a cooler for weak or diluted liquor, a refrigerator, and a pump; and the object of my invention is to effect a continuous circulation of the ammonia in its vapor or gaseous and liquid conditions by employing the weak or diluted liquid ammonia as an absorbing medium after it has been reduced in temperature by the use of a weak liquid-cooler and the partially-spent vapor from a refrigerator. This object I accomplish by the apparatus illustrated in the accompanying drawings, in which—

Figure 1 represents a vertical sectional view of my improved absorber and its connections with a retort or evaporator, a vapor-condenser, a cooler, a refrigerator, and a pump. Fig. 2 is a top view of the refrigerator.

Similar letters in the two figures refer to like parts.

A represents a retort or evaporator with heater B. C is a vapor-condenser. D is a cooler for diluted or weak liquor, and E is a refrigerator, all of the ordinary kind.

F represents the shell of the absorber, which is surrounded by the water-jacket G.

H is the purge-tank, and I is a force-pump.

The heater B is provided with a steam-pipe, J, near its top, and pipe K at its base for carrying off condensed steam.

The vapor-pipe L leads from the top of the retort A to the condenser C. Said pipe is provided with a valve, 1, near the retort, and forms the condensing-coil M in the condenser C, and the liquid-ammonia pipe V. The pipe V is provided with the valve $b$ and pressure-gage $g'$, and terminates in the upper end of the distributer O.

P P P P P represent several independent coils of pipe in the refrigerator-box E, one end of each coil starting from the distributer O, with valves $y'$, and discharging at the other end into the collector Q. This collector Q is provided at its base with a downward-projecting pipe, R, for the spent vapors to pass through into the absorber-coil S. The vapor-pipe R is provided with a valve, 7, and a pressure-gage, $g^2$.

N is a pipe leading from the base of the retort A into the cooler D, forming the cooler-coil U, and discharging into the absorber F through the cold-liquor pipe T and the rose jet or sprinkler W. Said pipe N is also provided with a valve, 3, near the retort A, as shown in Fig. 1, and is used as the diluted or weak liquor pipe.

X is a cold-water supply-pipe, with branch $m$, for cooling the absorber F, and further provided with a branch, Y, for supplying the condenser C and cooler D with water. Z is a water-pipe leading from the top of the condenser C into the base of the cooler D for supplying the cooler with water from the condenser C. The cooling-chamber D is provided near its upper end with an overflow-pipe, $a$, as shown.

The purge-pipe $b'$ leads from the top of the absorber F into the tank H, and is provided with a cock, $b^2$, for opening or closing said pipe, when required. The tank H is also provided with a pet-cock, $e$, for discharging the contents of said tank.

The shell of the absorber F is provided with a pressure-gage, $g^3$, above, and a Scotch-glass gage, $c$, at one side, to determine the height of liquor in the absorber.

The force-pump I is provided with an inlet-pipe, $i$, which leads from the interior of the absorber through the water-jacket G to the pump, with a valve, 5, between them. The discharge-pipe $i'$ leads from the pump to the retort, with two check-valves, $f\,f$, between the valves 2 and 4, as shown.

The operation of my improved absorber with the other apparatus is as follows, to wit: The retort or evaporator A is charged with aqua-ammonia, about two-thirds full. The absorber F is also charged with the same, about one-half full. The retort A is made of iron, strong enough to withstand an extremely high pressure of ammonia. Steam is introduced through the pipe J into the heater B, and the aqua-ammonia in the retort A is evaporated. It is obvious that the heater B may be a plain cylinder, as shown, or a coil of pipe, if desired. The vaporized ammonia then passes through the pipe L into the coil M of the condenser C, (the coil M being immersed in cold water fed to said condenser by the branch Y of the water-pipe X,) and is reduced to a liquid state, and is discharged in this condition through the pipe Y into the distributer O. From the distributer O the liquid ammonia passes through the valves $y$ into the coils P of the refrigerator E, and in distributing said liquid ammonia it is relieved of its pressure, and is instantly converted into its gaseous condition, which rapidly absorbs heat, and consequently reduces the surrounding temperature. The gas, after performing its functions in the refrigerator E, is allowed to escape from the coils P into the collector Q, and from said collector the gas is conducted by the pipe R to the absorber-coil S, and discharged in the absorber near the suction-pipe $i$ of the pump I. The refrigerating effects of the spent gas in passing through the coil S cool the liquor contained in the absorber. As the spent gas is discharged from the lower end of the absorber-coil S it intermixes with the liquor, and is absorbed by mutual affinity. As the gas is discharged from the coil S the temperature of the liquor in the vicinity of the discharge is increased, and this warmed liquor in the absorber F is then returned to the retort A by means of the force-pump I, the flow of liquid to the pump being regulated by the stop-valve 5 in the pipe $i$, so as to keep the quantities of the liquid in the retort A and the absorber F at their relative height—i.e., the retort about two-thirds full, the absorber about one-half full. The weak liquor in the retort is forced, by means of the pressure generated in the retort A, from the bottom of the retort through the pipe N, coil U, and pipe T to and through the sprinkler W of the absorber into the coil S, and the quantity thus forced through said pipes into the absorber is regulated by the valve 3, as shown.

The cooler D is supplied with water, as before described, from the condenser C by means of the pipe Z. This water, having already been used in the condensation of the vaporized ammonia, is here further utilized to cool the weak liquor, as it passes through the coils U through the pipe T, and rose jet or sprinkler W into the absorber, to a temperature and condition favorable to an absorption of the spent vapor as it is discharged into the absorber.

The branch $m$ of the cold-water pipe X discharges its water on the top plate of the absorber F, and the water runs down its sides into the water-jacket G, from which it escapes by the overflow-pipe $d$.

In order to have full control in regulating the working of the apparatus, a pressure-gage, $g$, is conveniently placed on the retort A; also, a gage, $g'$, is placed on the pipe V near the regulating stop-valve $b$. The gage $g^2$ is attached to the spent-vapor pipe R, and the gage $g^3$ is attached to the top of the absorber F.

The purge-pipe $b'$ and tank H are for the purpose of purging the whole apparatus of atmospheric air. The pipe $b'$ conducts the air to near the bottom of the tank H, which is partially filled with water, which absorbs by affinity any ammonia that may escape through the pipe $b'$ with the air.

The pet-cock $e$ in the head of the tank is used to allow the air to escape from the tank.

I am aware that prior to my invention ice-making apparatuses in various forms have been made. I therefore do not claim, broadly, any retort, condenser, cooler, or refrigerator; but What I do claim as my invention, and desire to secure by Letters Patent, is—

1. In a vapor or gas absorber for ammonial refrigerating or ice-making apparatus, the absorber consisting of the metallic air and water tight case F, inserted in a water-jacket, G, and provided with an absorber-coil, S, a glass gage, $c$, a pressure-gage, $g^3$, a rose jet or sprinkler, W, a purge-pipe, $b'$, with cock $b^2$, and suction-pipe $i$, for a pump, substantially as shown and described.

2. In combination with the absorber, constructed substantially as described and containing an absorber-coil pipe, S, and a rose jet or sprinkler, W, the pipe R, with valve 7, and pressure-gage $g^2$, and the collector Q, of the refrigerator E, substantially as specified.

3. In combination with the absorber F, constructed as described, and containing the absorber-coil S, and rose jet or sprinkler W, the pipe T, the cooler D, with coil U, the pipe N, with stop-valve 3, and the retort A, as and for the purpose specified.

4. In combination with the absorber F, constructed as described, and containing an absorber-coil, S, and rose jet or sprinkler W, the purge-pipe $b'$, with stop-valve $b^2$, and the tank H, with discharge-cock $e$ in its top, substantially as specified.

5. In a vapor or gas absorber for ammonial refrigerating or ice making apparatus, the rose jet or sprinkler W, located in the center of the top inside over the absorber-coil S, and the lower end of the coil S discharging the spent gas in close proximity to the suction-pipe $i$ of the pump, as and for the purpose specified.

6. In a vapor or gas absorber for ammonial refrigerating or ice-making apparatus, the absorber F, substantially as described, with water-jacket G surrounding it, combined with the cold-water pipe $m$, as and for the purpose specified.

In testimony whereof I have signed my name to this specification in the presence of two subscribing witnesses.

GEO. W. STOCKMAN.

Witnesses:
E. O. FRINK,
SAMUEL STEPHENS.